United States Patent
Tewalt

(10) Patent No.: US 8,548,974 B2
(45) Date of Patent: Oct. 1, 2013

(54) APPARATUS AND METHODS FOR PROVIDING GEOGRAPHICALLY ORIENTED INTERNET SEARCH RESULTS TO MOBILE USERS

(75) Inventor: Wayne R. Tewalt, Post Falls, ID (US)

(73) Assignee: The Boeing Company, Chicago, IL (US)

( * ) Notice: Subject to any disclaimer, the term of this patent is extended or adjusted under 35 U.S.C. 154(b) by 1903 days.

(21) Appl. No.: 11/188,328

(22) Filed: Jul. 25, 2005

(65) Prior Publication Data

US 2007/0022097 A1    Jan. 25, 2007

(51) Int. Cl.
G06F 7/00    (2006.01)
G06F 17/30    (2006.01)

(52) U.S. Cl.
USPC ............................ 707/707; 707/770; 709/217

(58) Field of Classification Search
USPC .................................................. 707/707, 770
See application file for complete search history.

(56) References Cited

U.S. PATENT DOCUMENTS

| | | | | |
|---|---|---|---|---|
| 5,991,687 | A | * | 11/1999 | Hale et al. ...................... 701/470 |
| 6,070,157 | A | * | 5/2000 | Jacobson et al. ...................... 1/1 |
| 6,421,675 | B1 | * | 7/2002 | Ryan et al. ............................ 1/1 |
| 6,558,820 | B2 | * | 5/2003 | Raychaudhuri et al. ....... 428/690 |
| 6,571,279 | B1 | | 5/2003 | Herz et al. |
| 6,601,173 | B1 | * | 7/2003 | Mohler .............................. 726/7 |
| 6,848,542 | B2 | | 2/2005 | Gailey et al. |
| 6,856,820 | B1 | | 2/2005 | Kolls |
| 6,871,140 | B1 | * | 3/2005 | Florance et al. .............. 701/516 |
| 2003/0061211 | A1 | * | 3/2003 | Shultz et al. ....................... 707/3 |
| 2003/0199281 | A1 | * | 10/2003 | Rathnasabapathy et al. . 455/461 |
| 2004/0098377 | A1 | * | 5/2004 | Kraft ................................ 707/3 |
| 2004/0201500 | A1 | * | 10/2004 | Miller et al. ................ 340/995.1 |
| 2005/0065682 | A1 | * | 3/2005 | Kapadia et al. .................. 701/35 |
| 2005/0076014 | A1 | * | 4/2005 | Agarwal et al. ................... 707/3 |
| 2005/0076017 | A1 | * | 4/2005 | Rein et al. .......................... 707/3 |
| 2006/0248078 | A1 | * | 11/2006 | Gross et al. ........................ 707/5 |

OTHER PUBLICATIONS

U.S. Appl. No. 10/103,979, filed Mar. 22, 2002.

* cited by examiner

Primary Examiner — Daniel Kuddus
(74) Attorney, Agent, or Firm — Harness, Dickey & Pierce, P.L.C.

(57) ABSTRACT

A method of providing Internet search results to a user on a mobile platform. Search terms are received from the user via a web portal. Information pertaining to the user and/or to the platform is used to identify a marketplace relevant to the user. A search engine is selected based on the identified marketplace. The search terms are submitted to the selected search engine.

20 Claims, 2 Drawing Sheets

APPARATUS AND METHODS FOR PROVIDING GEOGRAPHICALLY ORIENTED INTERNET SEARCH RESULTS TO MOBILE USERS

FIELD OF THE INVENTION

The present invention relates to mobile communication systems and particularly (but not exclusively) to providing Internet search results to a user on board a mobile platform.

BACKGROUND OF THE INVENTION

Broadband communication services have recently become available to users aboard mobile network platforms, including but not limited to aircraft, trains, ships and automobiles. Connexion by Boeing$^{SM}$ (CBB), for example, makes it possible for airborne customers using personal computing devices (PEDs) to access data services such as the Internet through a CBB web portal. Where a mobile platform portal allows a customer to search the Internet, the customer may submit search terms to a search engine in the same or similar manner as in terrestrial Internet searching. The user may be provided with search results ranked by their relevance to the search terms.

Search engines typically attempt to provide search results that are geographically appropriate to a searching customer on the ground. For example, a search engine receiving a search request from someone in Japan typically attempts to return search results (including advertising) relevant to a Japanese market. The location of an aircraft passenger in airspace, however, is not readily associated with a particular regional or national marketplace. Furthermore, the intent of a passenger performing an Internet search might be unclear. For example, if an in-flight search user en route to Japan were to enter the search term "sushi restaurant", (s)he would have to enter additional search terms (e.g., "Japan") to enable the search engine to determine a marketplace intended by the user. An inability to automatically associate a geographic region with search criteria can make it difficult for the search engine to return search results relevant to the user. It also can make it very difficult for the search engine to accurately correlate the search request with an intended geographic market for the purpose of charging for advertising.

SUMMARY OF THE INVENTION

The present invention, in one implementation, is directed to a method of providing Internet search results to a user on a mobile platform. Search terms are received from the user via a web portal. Information pertaining to the user and/or to the platform is used to identify a marketplace relevant to the user. A search engine is selected based on the identified marketplace. The search terms are submitted to the selected search engine.

In another implementation, the invention is directed to an apparatus for providing Internet search results to a user on a mobile platform. A portal is accessible on the platform whereby a user may enter an Internet search request. A controller is configured to receive the search request and use information pertaining to the platform and/or to the user to identify a marketplace relative to which a search is to be performed. The controller is also configured to select a search engine based on the identified marketplace, submit the search request to the selected search engine, and send search results received from the selected search engine to the user.

In yet another implementation, the invention is directed to a

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF EMBODIMENTS

The following description of various embodiments is merely exemplary in nature and is in no way intended to limit the invention, its application, or uses. Although the following description is related generally to geographically oriented Internet searching by mobile users, it will be understood that the principles of the present invention are applicable to a variety of other users in various settings. Therefore, it will be understood that the following discussion is not intended to limit the scope of the appended claims.

Figure 1:
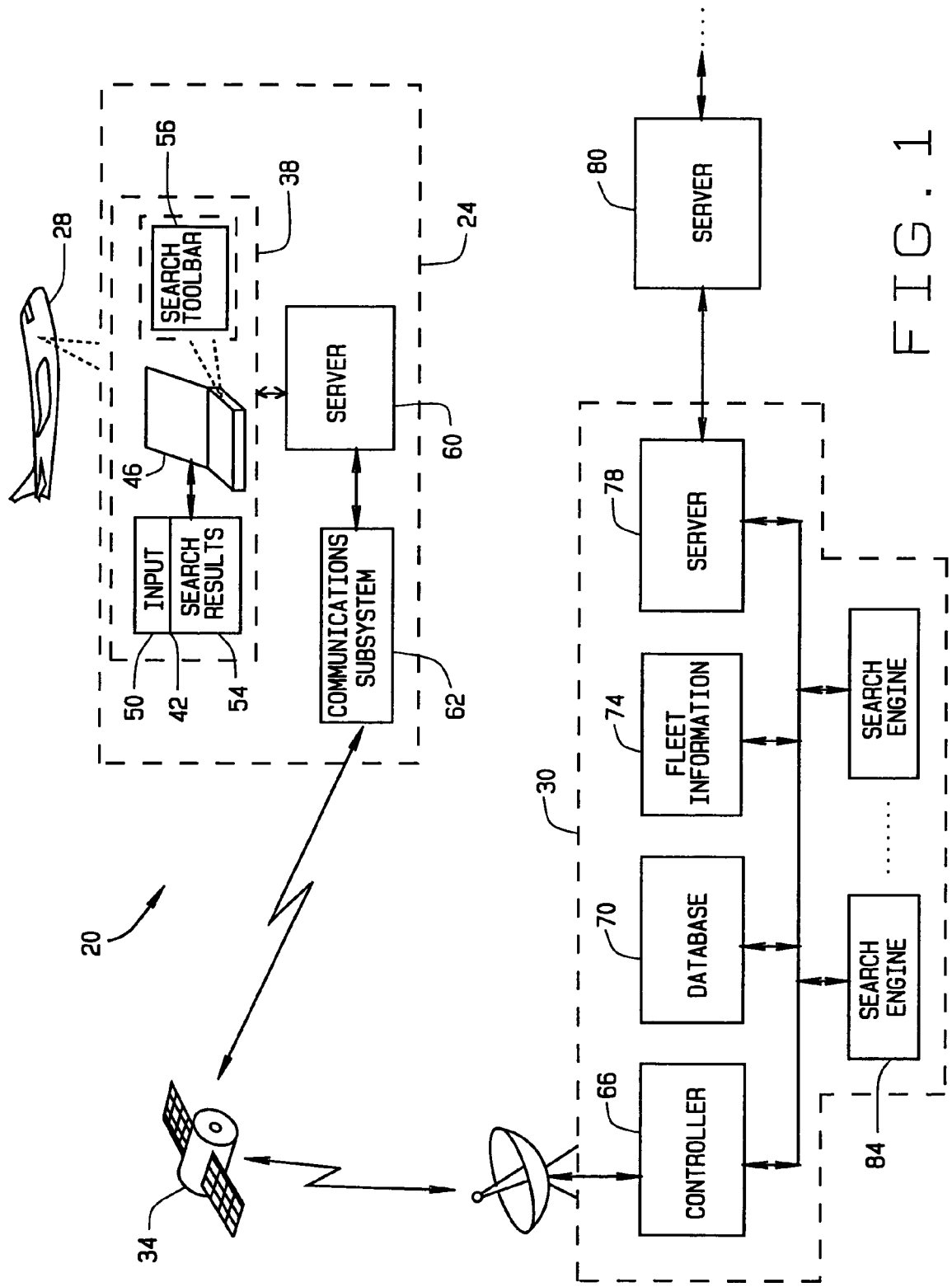
FIG. 1 is a schematic depicting an apparatus for providing Internet search results to a user on a mobile platform in accordance with one implementation of the present invention.

An embodiment of an apparatus for providing Internet search results to a user on a mobile platform is indicated generally in FIG. 1 by reference number 20. The apparatus 20 includes a mobile system 24 on board a mobile platform 28. The platform 28 may be any type of moving platform that can transport one or more users, for example, an aircraft, motor vehicle, ship, train, bus, etc. The platform mobile system 24 is in two-way communication with a ground system 30 via at least one satellite 34. The ground system 30 may also communicate with other mobile platforms, e.g., other aircraft in a fleet, included in the apparatus 20.

A user on board the platform 28 may use a user interface system 38 to communicate with the ground system 30. The user interface system 38 includes a portal 42 and a user device 46, e.g., a personal electronic device (PED), whereby the user may communicate with the ground system 30 via the portal 42. The user device 46 may also be, for example, part of an entertainment system of the platform 28. Alternatively or additionally, the device 46 may include laptops, personal digital assistants, smart phones, cell phones, handheld computers or any other device capable of displaying Web-based information and/or communicating data. A user may use the user device 46 to enter an Internet search request as input 50 to the portal 42. Search results 54 may be returned to the user device 46 via the portal 42. In the present embodiment, the user device 46 also includes a search toolbar client 56, further described below. The toolbar client 56 is optional. In at least one other embodiment, no toolbar client is included in the user device.

The user interface system 38 is in communication with an on-board server 60. The server 60 communicates with the ground system 30 via a communications subsystem 62 including at least one antenna (not shown). The ground system 30 includes a controller 66 that receives data from the user interface system 38, analyzes the data, and performs operations based on the analysis. The controller 66 is also in communication with a database 70, a fleet information source 74, and a server 78. The fleet information source 74 may provide, for example, information from an aircraft communications addressing and reporting system (ACARS) managed by Aeronautical Radio, Inc. (ARINC). Fleet information from the source 74 may include but is not limited to the aircraft 28 departure location, destination location, real-time navigation information, anticipated route of travel, tail number, and other identification information associated with the aircraft 28.

The server 78 can send data to and receive data from the Internet, for example, via one or more servers 80. The ground system 30 includes a plurality of search engines 84 accessible by the controller 66. The database 70 includes information whereby the search engines 84 are associated with a plurality of Internet search marketplaces. For example, the database 70 could associate the country of Japan with a given search engine 84, where that search engine is capable of providing search results originating in Japan. It can be appreciated that other or additional criteria could be used to associate a given marketplace with a search engine.

Figure 2:
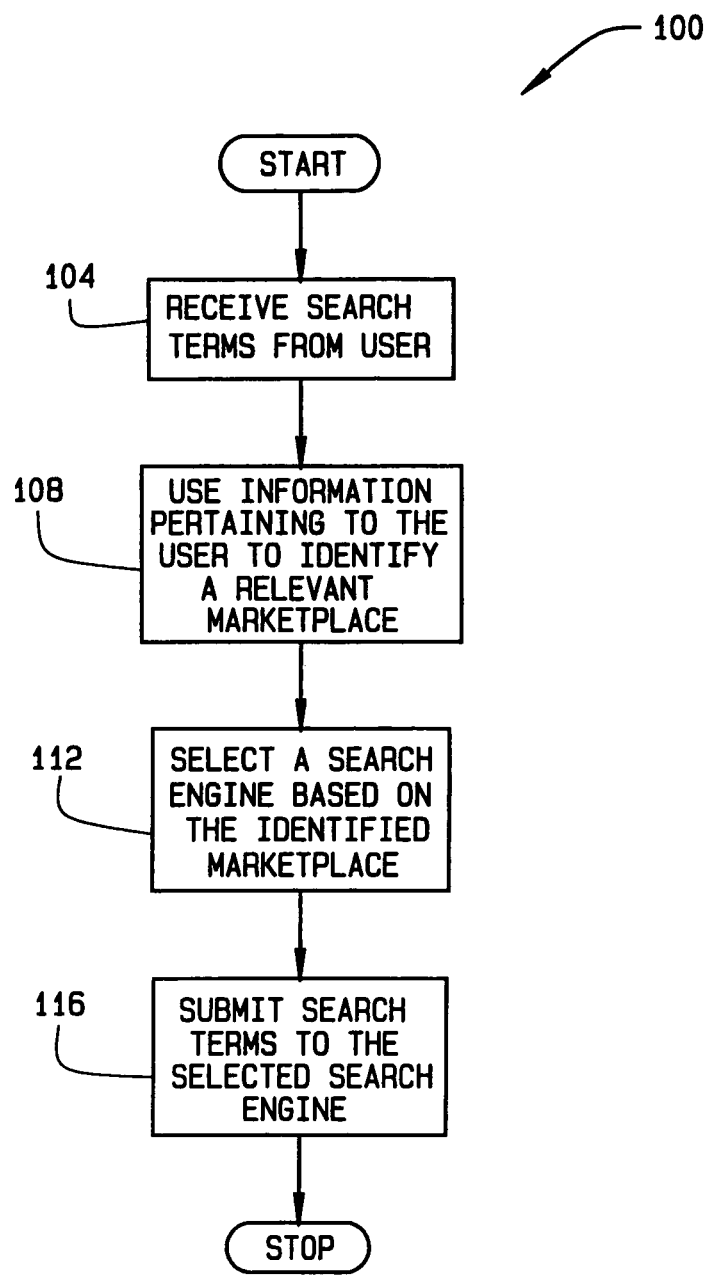
FIG. 2 is a flow diagram of a method of providing Internet search results to a user on a mobile platform in accordance with one implementation of the present invention.

In one implementation, a method of providing Internet search results to a user on the platform 28 is indicated generally in FIG. 2 by reference number 100. The method 100 may be performed by the controller 66. It should be noted generally, however, that various hardware, software and/or firmware configurations could be used to perform the various functions and methods described herein. Thus, for example, in some configurations the method 100 could be performed using different or additional controller(s), computer(s) and/or processor(s), which could be stationary and/or mobile. It should be further noted that the terms "controller", "computer", "processor" and the like may be used interchangeably.

Referring now to FIG. 2, in step 104 the controller 66 receives Internet search terms from a user via the portal 42. In step 108 the controller 66 uses information pertaining to the user to identify a marketplace relevant to the user. For example, in one implementation the controller 66 by default associates a destination of the aircraft 28 with a destination marketplace. The controller 66 may access the fleet information source 74 to obtain the aircraft destination. Where, for example, the aircraft destination is Munich, Germany, the controller 66 may identify the country of Germany (or, in one implementation, the city of Munich) as the marketplace relevant to an Internet search by the user. In step 112 the controller 66 selects one of the search engines 84 based on the marketplace identified in step 108. The controller 66 may make this selection based on information in the database 70. In step 116 the controller 66 submits the user search terms to the selected search engine 84.

The search engine 84 may perform an Internet search, e.g., via the server 78 and server(s) 80, based on the search terms submitted by the user. The selected search engine 84 may return search results to the controller 66. Where, for example, the aircraft 28 is one of a fleet of mobile platforms in communication with the ground system 30, the controller 66 identifies the aircraft 28 as the platform to receive the search results. The controller 66 sends the search results to the server 60 of the platform mobile system 24. The server 60 serves the results to the user device 46 for display to the user.

Referring again to FIG. 2, the controller in step 108 may refer to other or additional information pertaining to the user to identify a marketplace. For example, the platform 28 departure location could be used, alone or in combination with the platform 28 destination, in identifying a marketplace. The controller 66 thus may provide search results to the user without requiring the user to input the information used to identify a marketplace. In some implementations, the apparatus 20 uses an ultimate destination of the user in identifying a marketplace. The user, for example, may be asked, while logging in to the mobile system 24, to provide his/her final destination to the apparatus 20. Accordingly, where a user plans to continue traveling on another platform when the aircraft 28 reaches its destination, the controller 66 may select a search engine 84 that provides search results relevant to the user's final destination.

In some implementations, additional information may be obtained and used by the controller 66 to refine the user's search terms. In such manner, Internet search results may be personalized for the user. For example, user preferences and demographic details included in user settings and user profiles may be extracted from device 46 databases and/or cache memory. Thus, for example, a user profile that includes a user home address could be used to identify a nationality and/or preferred language of the user. Information useful in refining search results may also be included in user profiles, preferences and/or account information obtained by the apparatus 20 in connection with the user's login and authorization to use the apparatus 20.

Additional information may also include a type of the user device 46 and a type of the platform 28. A user device type could be, for example, a handheld personal digital assistant (PDA), laptop, in-flight entertainment system, smart phone, cabin control panel, etc. A platform type could be, for example, a commercial aircraft, executive jet, cargo ship, train, cruise ship, automobile, etc. An algorithm used, for example, by the controller 66 may include the foregoing information to provide search results relevant to a particular user. For example, a searching laptop user may be provided with results targeting business travelers, and results for an in-flight entertainment system search could provide results that require little or no manual text input. Additionally or alternatively, a physical location of a user in a platform could be used to refine a search. For example, a user in a first-class section of the aircraft 28 could be distinguished from a user in a coach section of the aircraft. Search results thus could be tailored, for example, in accordance with pre-designated demographic profiles associated with a physical location in the aircraft 28.

Referring to FIG. 1, the search toolbar client 56 may also be used to provide information useful for personalizing search results for a user. The toolbar 56 may be downloadable and persistently present in the user device 46. Personalized search information may be incorporated and displayed by the toolbar 56. For example, the toolbar 56 may be configured to automatically identify a platform destination. The toolbar 56 may retain such functionality, which subsequently may be used on another platform included in the apparatus 20 to identify a destination of the other platform. When the toolbar 56 is launched in the device 46, the toolbar 56 may continuously seek source(s) of data useful for personalizing search results, for example, platform destination and departure locations, personal preferences, user device type, platform type, user physical location, etc.

The foregoing methods and apparatus make it possible to offer Internet searching to travelers in a way that is intuitive for the search user while meeting the needs of paid search contracts with advertisers. The foregoing implementations provide great utility for general Internet searching by mobile users. Implementations of the invention are more easily used, can lead to higher Internet search usage, and can facilitate higher click-through conversion rates for advertisements compared to previous methods. Opportunities for revenue sharing among Internet service providers and search providers also can be increased. A search engine can be selected for a mobile user based, for example, on an ability of the selected search engine to provide search results relative to a given marketplace and relevant to the user. For example, a search engine could be selected that could provide search results in a language associated with the marketplace and familiar to the user.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of providing Internet search results to a user on a mobile platform, the method performed by at least one controller computer in communication with a mobile computing system of the platform, the method comprising:
   receiving search terms from the user via a web portal of the mobile computing system;
   obtaining an identification of the platform as to a fleet that includes the platform and obtaining a departure location for the platform and a destination of the platform, the obtaining performed by the at least one controller computer accessing a ground-based fleet information source;
   identifying a search marketplace for the user based on at least one of the following: (a) the destination of the platform, (b) the departure location for the platform, and (c) a destination to which the user is traveling that is different from the destination of the platform, (d) without requiring the user to input the information used to identify the marketplace;
   selecting one of a plurality of search engines, the selecting performed by the at least one controller computer using the identified search marketplace and a database in which the plurality of search engines are associated with a plurality of search marketplaces, the database configured to provide for selection of a search engine from the plurality of search engines on at least a geographic basis;
   submitting the search terms to the selected search engine; and
   using the platform identification to return one or more search results received from the selected search engine to the user.

2. The method of claim 1, further comprising displaying search results received from the selected search engine to the user, the displaying performed based at least in part on a physical location of the user relative to the platform.

3. The method of claim 1, wherein the platform includes an aircraft.

4. The method of claim 1, further comprising associating a platform seat location of the user with search results from the selected search engine.

5. The method of claim 1, wherein the fleet information source provides information from an aircraft communications addressing and reporting system (ACARS).

6. The method of claim 1, further comprising selecting one of the search engines based at least in part on a language associated with the identified search marketplace.

7. The method of claim 1, wherein submitting the search terms comprises using at least one of the following to refine the search terms: a platform type, a user location in the platform, a type of user device, a user setting, and a user profile.

8. The method of claim 1, further comprising using a search toolbar client of a device of the user to obtain information related to the user and obtained on another platform.

9. The method of claim 1, further comprising using an entertainment system of the platform to receive the search terms from the user.

10. An apparatus for providing Internet search results to a user on a mobile platform, the apparatus comprising:
    a mobile computing system of the platform, the mobile computing system having at least one processor and memory configured to execute instructions to provide a portal accessible on the platform whereby a user may enter an Internet search request; and
    a ground system in communication with the mobile platform computing system, the ground system having at least one controller computer, a source of fleet information pertaining at least to a fleet that includes the mobile platform, and a database in which a plurality of search marketplaces are associated, on at least a geographic basis, with a plurality of search engines accessible via the ground system;
    the at least one controller computer having at least one processor and memory configured to execute instructions to:
    receive a search request from the user via the portal;
    obtain data from the fleet information source identifying the platform and at least one of a departure location and a destination of the platform;
    use at least one of the obtained fleet information source data and a destination of the user different from the destination of the platform to identify a search marketplace;
    use the database to select a search engine from the plurality of search engines based on the identified search marketplace, without requiring the user to input the information used to identify the marketplace;
    submit the search request to the selected search engine; and
    send search results received from the selected search engine to the user based on the obtained fleet information source data identifying the platform.

11. The apparatus of claim 10, configured to provide search results to one or more users on one or more aircraft.

12. The apparatus of claim 10, further comprising:
    a user device connected to the portal whereby the user enters the search request; and
    a toolbar client operating in the user device;
    the at least one controller computer further configured to store information in the toolbar client for refining a subsequent search request by the user when the user is on another mobile platform for which the apparatus is configured to provide search results.

13. The apparatus of claim 10, wherein the fleet information source provides information from an aircraft communications addressing and reporting system (ACARS).

14. The apparatus of claim 10, wherein the user provides travel-related information to the apparatus to obtain authorization to use the apparatus, the at least one controller computer further configured to use the travel-related information to personalize the search request.

15. An apparatus for providing Internet search results to users on one or more aircraft, the apparatus comprising:
    on each aircraft, a mobile computing system having at least one processor and memory configured to execute instructions to provide a portal whereby a user on the aircraft may enter an Internet search request; and
    a ground system configured to communicate with each aircraft mobile computing system, the ground system having at least one controller computer, an aircraft fleet information source, and a database in which a plurality of search marketplaces are associated, on at least a geographic basis, with a plurality of search engines accessible via the ground system;

the at least one controller computer having at least one processor and memory configured to execute instructions to:

receive a search request from a user via the portal of one of the aircraft;

obtain data from the fleet information source identifying the one of the aircraft and at least one of a departure location and a destination of the one of the aircraft;

identify a search marketplace for the user based on at least one of the obtained aircraft fleet information source data and a destination to which the user is traveling that is different from the destination of the one of the aircraft;

use the database to select a search engine from the plurality of search engines based on the identified search marketplace, without requiring the user to input the information used to identify the marketplace;

submit the search request to the selected search engine; and send search results received from the selected search engine to the user; the sending performed using the fleet information source data identifying the one of the aircraft.

16. The apparatus of claim 15, the mobile computing system of each aircraft comprising a server configured to receive the search results from the ground system and to serve the search results to the user.

17. The apparatus of claim 15, further configured to execute instructions to refine the search results based on a section of the aircraft in which the user is physically located.

18. The apparatus of claim 15, the ground system configured to communicate with each aircraft mobile computing system via at least one satellite.

19. The apparatus of claim 15, the portal of one of the aircraft provided via an entertainment system of the one of the aircraft.

20. The apparatus of claim 15, the aircraft fleet information source configured to provide aircraft communications addressing and reporting system (ACARS) information.

* * * * *